(12) United States Patent
Watanabe

(10) Patent No.: US 6,519,483 B1
(45) Date of Patent: Feb. 11, 2003

(54) PORTABLE WIRELESS INFORMATION TERMINAL APPARATUS IN WHICH VIEW OF DISPLAY UNIT AND OPERATION OF OPERATIONAL SECTION ARE EASY TO PERFORM DURING USING

(75) Inventor: Yosuke Watanabe, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/724,235

(22) Filed: Nov. 28, 2000

Related U.S. Application Data

(63) Continuation of application No. 09/061,748, filed on Apr. 16, 1998, now Pat. No. 6,233,469.

(30) Foreign Application Priority Data

Apr. 25, 1997 (JP) .............................................. 9-108759

(51) Int. Cl.⁷ ................................................. H04B 1/38
(52) U.S. Cl. ......................... 455/575; 455/550; 455/90; 455/566
(58) Field of Search ................................. 455/575, 550, 455/90, 566, 348, 351; 379/428.01, 433.01, 56.1, 56.3; D14/137, 138

(56) References Cited

U.S. PATENT DOCUMENTS

| | | | |
|---|---|---|---|
| 5,260,998 A | 11/1993 | Takagi | .......................... 379/433 |
| 5,414,444 A | 5/1995 | Britz | |
| 5,465,401 A | 11/1995 | Thompson | ................... 455/558 |
| 5,566,224 A | 10/1996 | Ul Azam et al. | ............ 455/566 |
| 5,661,641 A | 8/1997 | Shindo | |
| 5,857,157 A | 1/1999 | Shindo | ........................ 455/550 |
| 5,867,795 A * | 2/1999 | Novis et al. | ................. 455/566 |
| 5,901,223 A | 5/1999 | Wicks et al. | ................. 379/433 |
| 5,970,418 A * | 10/1999 | Budd et al. | ................ 455/550 |
| 6,073,033 A * | 6/2000 | Campo | ........................ 455/566 |
| 6,233,469 B1 * | 5/2001 | Watanabe | .................... 455/575 |

FOREIGN PATENT DOCUMENTS

| | | | | |
|---|---|---|---|---|
| GB | 2256774 | 12/1992 | | |
| GB | 2289595 | 11/1995 | | |
| GB | 2315186 | 1/1998 | | |
| GB | 2318945 | 5/1998 | | |
| JP | 61-134159 | 8/1986 | | |
| JP | 3-111045 | 11/1991 | | |
| JP | 4-49746 | 2/1992 | | |
| JP | 6-318903 | 11/1994 | | |
| JP | 7-170562 | 7/1995 | | |
| JP | 7-312631 | 11/1995 | | |
| JP | 8-140130 | 5/1996 | | |
| JP | 8-297639 | 11/1996 | | |
| JP | 8-321863 | * 12/1996 | ............ H04M/1/03 | |
| JP | 9-247250 | 9/1997 | | |
| JP | 331225 | 11/2000 | | |

OTHER PUBLICATIONS

Japanese Office Action issued Apr. 20, 1999 in corresponding Japanese application.
English translation of portions of Apr. 20, 1999 Japanese Office Action.

\* cited by examiner

Primary Examiner—Edward F. Urban
Assistant Examiner—Erika A. Gary
(74) Attorney, Agent, or Firm—Dickstein, Shapiro, Morin & Oshinsky, LLP.

(57) ABSTRACT

In a portable wireless information terminal apparatus, a terminal main body unit having a receiver unit and a transmitter unit. A data display unit is movably provided on the terminal main body unit.

2 Claims, 7 Drawing Sheets

PORTABLE WIRELESS INFORMATION TERMINAL APPARATUS IN WHICH VIEW OF DISPLAY UNIT AND OPERATION OF OPERATIONAL SECTION ARE EASY TO PERFORM DURING USING

This is a continuation of application Ser. No. 09/061,748, filed Apr. 16, 1998, now U.S. Pat. No. 6,233,469.

BACKGROUND OF THE INVENTION

1. Field of the Invention

The present invention relates to a portable wireless information terminal apparatus such as a portable telephone and the like, and more particularly to a portable wireless information terminal apparatus in which a view of a display unit and an operation of an operational section are easy to perform even during using.

2. Description of the Related Art

In a case of a conventional portable wireless information terminal apparatus represented by a portable telephone, as shown in FIG. 1, a terminal main body unit 50 has a configuration in which an upper casing 51 and a lower casing 52 are foldably disposed through a hinge 53. The upper casing 51 is provided with a receiver unit 54 and a display unit 55. The lower casing 52 is provided with a transmitter unit 56 and a key operation section 57.

In such a portable wireless information terminal apparatus, the display unit 55 is provided on a side of the upper casing 51 having the receiver unit 54. Thus, the display unit 55 is concealed by the side of the face of a user during calling. Therefore, information displayed on the display unit 55 can not be viewed.

In order to solve the above mentioned problem of the conventional portable wireless information terminal apparatus, a telephone in which information displayed on a display unit can be viewed even during calling is proposed in Japanese Laid-Open Utility Model Application (JU-A-Showa 61-134159).

FIG. 2 is a rear side appearance view which shows the telephone described in this Japanese Laid-Open Utility Model Application (JU-A-Showa 61-134159). FIG. 3 is a front side appearance perspective view which shows the telephone.

As shown in FIG. 2 and FIG. 3, in the telephone described in Japanese Laid-Open Utility Model Application (JU-A-Showa 61-134159), a receiver unit 61 and a transmitter unit 62 are provided on the front side of a terminal main body unit 60, and a display unit 63 and an operational section 64 are provided on the rear side thereof.

Then, as shown in FIG. 3, a second display unit 65 is further provided on the lower end side of the transmitter unit 62 of the terminal main body unit 60.

According to the telephone having such a configuration described in Japanese Laid-Open Utility Model Application (JU-A-Showa 61-134159), a user can view the second display unit 65, if tilting the terminal main body unit 60 so as to separate the side of the transmitter unit 62 from his mouth, without separating the receiver unit 61 from his ear. Thus, the information identical to that displayed on the display unit 63 can be viewed from the second display unit 65 while calling.

In the telephone described in Japanese Laid-Open Utility Model Application (JU-A-Showa 61-134159), the second display unit 65 can be viewed while calling. However, the operational section 64 is located on the rear side of the terminal apparatus. Thus, this results in a problem that the operational section 64 can not be operated while viewing the display units 65, 63, during calling.

Especially, since the above mentioned operation of the operational section 64 can not be performed, the screen operations of the display units 63, 65 and the like can not be performed during calling. Hence, the retrieval of the information within the terminal and the like can not be performed while calling, which is extremely inconvenient for the user.

The second display unit 65 is attached to the position adjacent to the transmitter unit 62. Therefore, even if the side of the transmitter unit 62 is separated from his mouth, the second display unit 65 is concealed behind his jaw and the like. This results in a problem that the visibility is not always excellent. In this case, this problem may be solved if placing the second display unit 65 at a position away from the transmitter unit 62 and further making the size larger. However, if so, the terminal main body unit 60 becomes larger, which is inconvenient for the utilization as the portable terminal apparatus.

Moreover, the transmitter unit 62 is separated from the mouth during calling. This results in a problem that it is difficult to input voice to the transmitter unit 62.

Another technique is disclosed in Japanese Laid-Open Utility Model Application (JU-A-Heisei 3-111045). This technique relates to a telephone apparatus installed in a movable body. The telephone apparatus is characterized by comprising: a movable body mount unit installed in the movable body; a handset unit connected to the movable body mount unit having a first display unit for giving information to a user; and a second display unit connected to at least one of the movable body mount unit and the handset unit. Then, the second display unit is described to be disposed such that the displaying direction thereof is adjustable.

However, if the second display unit is disposed in the handset unit, the handset unit is accordingly made larger. Thus, this is not suitable for the portable wireless information terminal apparatus of the prevent invention. Moreover, in the technique disclosed in Japanese Laid-Open Utility Model Application (JU-A-Heisei 3-111045), the operational section is concealed by the side of the user during using. Thus, the operational section can not be operated while viewing the display unit.

SUMMARY OF THE INVENTION

The invention is made to solve the above problems in the conventional technique. Therefore, an object of the present invention is to provide a portable wireless information terminal apparatus, which can easily view a display unit and operate an operational section even during using the terminal apparatus and especially operate the operational section simultaneously while viewing the display unit during calling.

In order to achieve an aspect of the present invention, a portable wireless information terminal apparatus includes a terminal main body unit having a receiver unit and a transmitter unit and a data display unit which is movably provided on the terminal main body unit.

The data display unit may be slidably engaged with the terminal main body unit. Also the data display unit may be tiltably provided on the terminal main body unit.

In order to achieve another aspect of the present invention, a portable wireless information terminal apparatus includes a terminal main body unit having a receiver unit and a transmitter unit, a movable body which is movably provided on the terminal main body unit. In this case, the movable body includes an operational section for operating the terminal main body unit and a data display unit.

An infrared ray communication may be performed between the terminal main body unit and the data display unit. Also the data display unit may be moved along a communication path of the infrared ray communication when being moved into the terminal main body unit.

The terminal main body unit may include a receiver unit mount section on which the receiver unit is provided, a transmitter unit mount section on which the transmitter unit is provided. In this case, the data display unit may be moved such that the data display unit is moved into and out from a portion closer to the transmitter unit mount section than the receiver unit mount section in the terminal main body unit.

The terminal main body unit has at least two sides provided to substantially oppose to each other. In this case, the transmitter unit is disposed closer to a first side than a second side among the two sides in the terminal main body unit. Also the data display unit may be slidable in a direction such that the data display unit is further spaced from the first side.

The terminal main body unit may have at least two sides provided to substantially oppose to each other. In this case, the transmitter unit may be disposed closer to a first side than a second side among the two sides in the terminal main body unit. The data display unit is tiltable in a direction in which the data display unit is spaced from the first side, with respect to an axis line along the second side disposed near the second side.

Also the terminal main body unit includes a first casing on which the transmitter unit is provided and a second casing on which the receiver unit is provided. In this case, the first casing and the second casing are foldably coupled to each other, and the data display unit is movably provided on the first casing, and the second casing, when folded, services a cover of said data display unit.

The terminal main body unit may include a first casing on which the transmitter unit is provided and a second casing on which the receiver unit is provided. The first casing and the second casing are foldably coupled to each other. The data display unit may be movably provided on the first casing. The second casing may include a stopper for preventing the data display unit from being moved from the first casing when folded.

The terminal main body unit may include a first casing on which the transmitter unit is provided and a second casing on which the receiver unit is provided. In this case, the first casing and the second casing are foldably coupled to each other. The data display unit may be movably provided on the first casing. The data display unit may be constructed such that a screen of the data display unit can be tilted and raised.

Also a portable wireless information terminal apparatus may include a terminal main body unit having a receiver unit and a transmitter unit and a movable body which is movably provided on the terminal main body unit and an operational section which is disposed separately from the terminal main body unit and the movable body to operate the terminal main body unit. In this case, the movable body may be provided with a data display unit. A signal may be transmitted and received between the operational section and one of the terminal main body unit and the movable body by using one of a wire communication and a wireless communication.

Also an infrared ray communication may be performed between the terminal main body unit and the movable body.

The movable body may be moved along a communication path of the infrared ray communication, when being moved into the terminal main body unit.

An infrared ray communication may be performed between the terminal main body unit and the data display unit. The data display unit may be moved along a communication path of the infrared ray communication, when being moved into the terminal main body unit.

Also the terminal main body unit may have at least two sides provided to be substantially oppose to each other. In this case, the transmitter unit may be disposed closer to a first side than a second side among the two sides in the terminal main body unit. The movable body may be slidable in a direction in which the movable body is spaced from the first side.

The terminal main body unit may have at least two sides provided to substantially oppose to each other. The transmitter unit may be disposed closer to a first side than a second side among the two sides in the terminal main body unit. The movable body may be tiltable in a direction spaced from the first side, with respect to an axis line along the second side disposed near the second side.

An infrared ray communication may be performed between the terminal main body unit and the data display unit. The data display unit may be moved along a communication path of the infrared ray communication, when being moved into the first casing.

Also an infrared ray communication may be performed between the terminal main body unit and the data display unit. In this case, the data display unit may be moved along a communication path of the infrared ray communication, when moved into the first casing.

DESCRIPTION OF THE PREFERRED EMBODIMENTS

Embodiments of a portable wireless information terminal apparatus of the present invention will be explained with reference to the drawings.

[First Embodiment]

At first, a first embodiment of the portable wireless information terminal apparatus of the present invention is explained with reference to FIG. 4 and FIG. 5.

Figure 1:
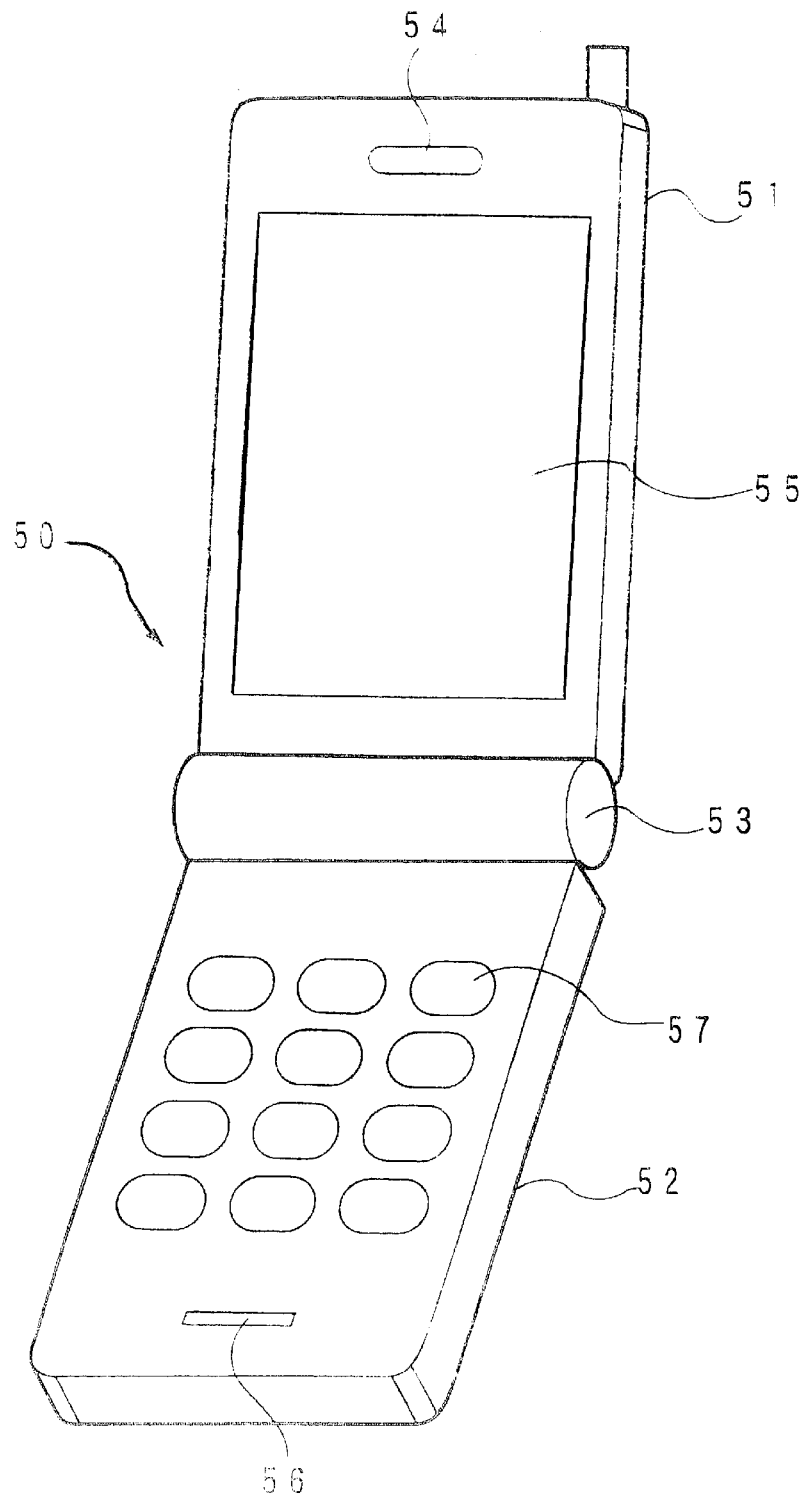
FIG. 1 is a perspective view in an open state showing a conventional foldable type of a portable wireless information terminal apparatus.
Figure 2:
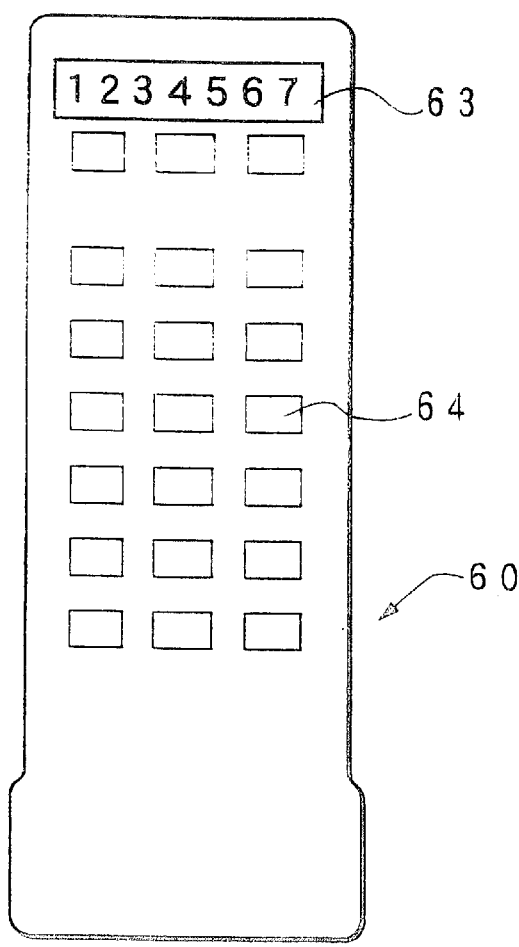
FIG. 2 is a view showing a conventional telephone when seen from the rear side.
Figure 3:
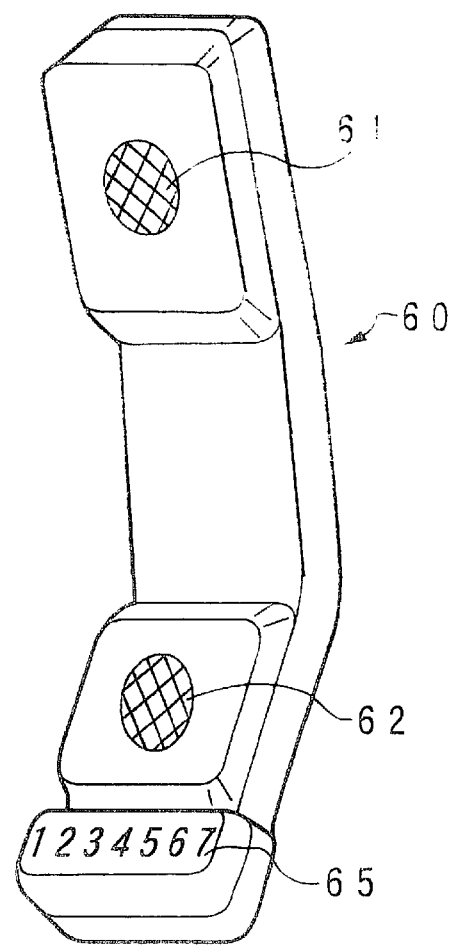
FIG. 3 is a perspective view showing the conventional telephone when seen from the front side.
Figure 4:
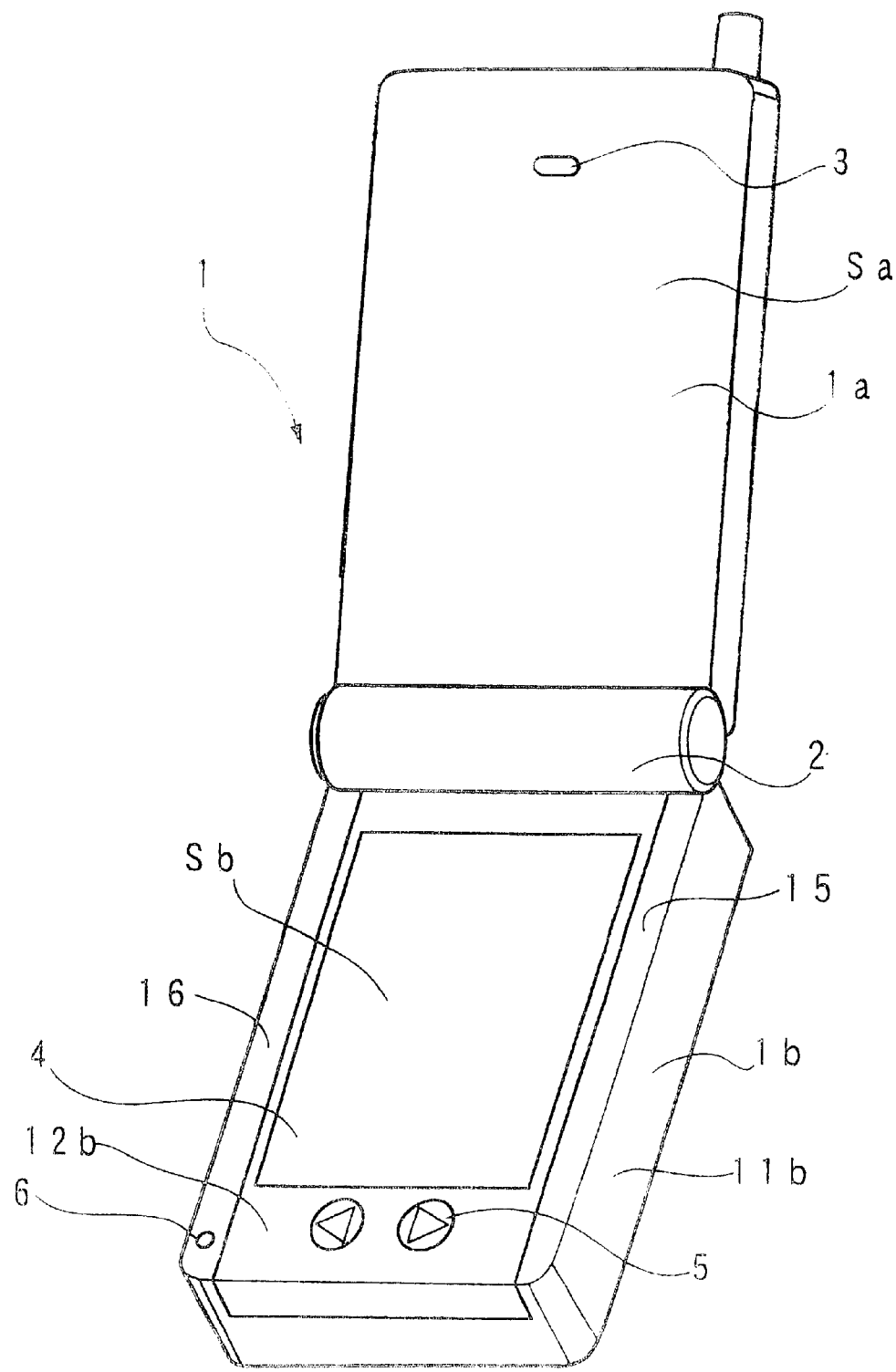
FIG. 4 is a perspective view showing a first embodiment of a portable wireless information terminal apparatus of the present invention, and shows the states of a display and an operational section before being slid.
Figure 5:
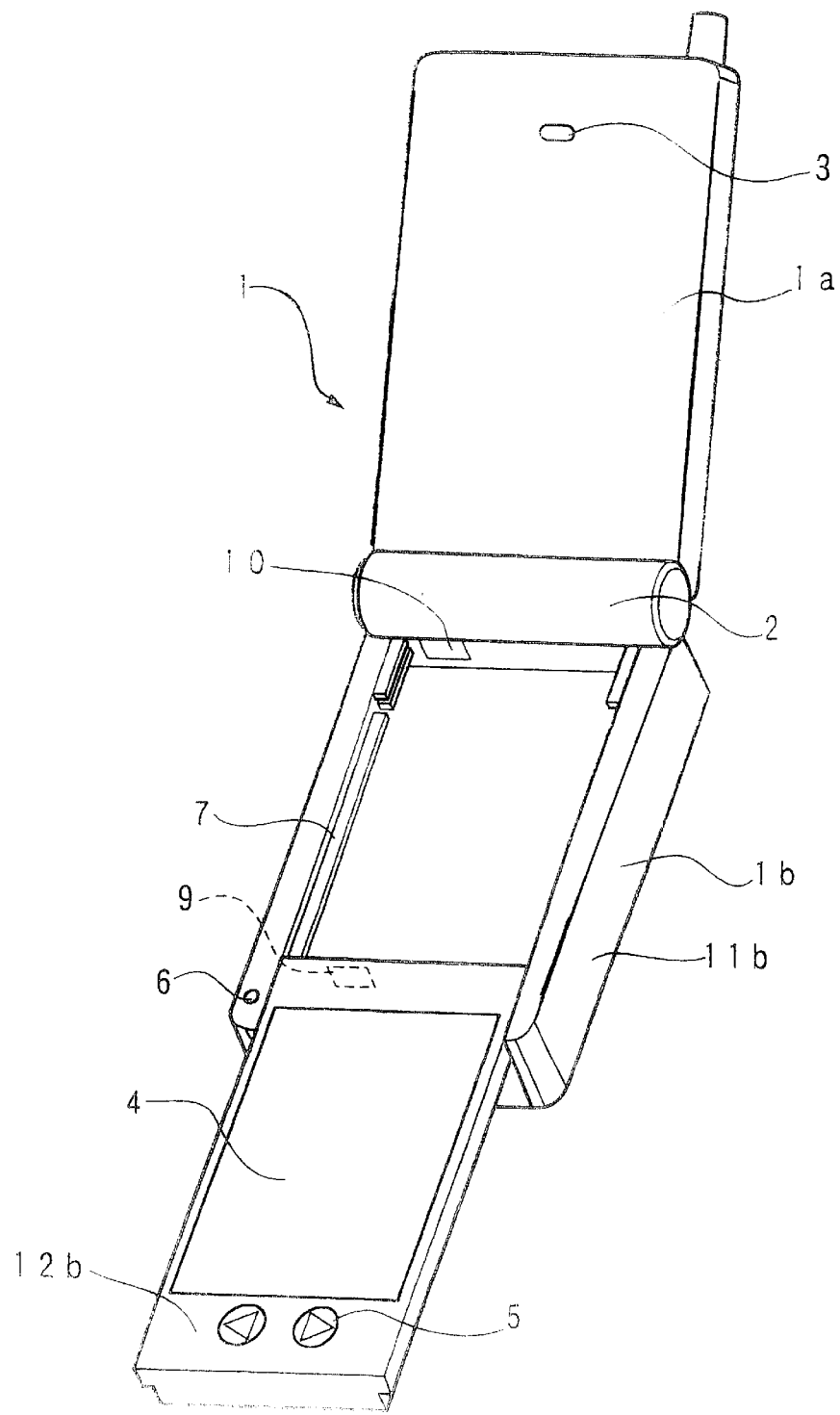
FIG. 5 is a perspective view showing the first embodiment of the portable wireless information terminal apparatus of the present invention, and shows the states of the display and the operational section after being slid.

FIG. 4 and FIG. 5 are perspective views showing the first embodiment of the portable wireless information terminal apparatus of the present invention. FIG. 4 shows the states of a display unit and an operational section before being slid. FIG. 5 shows the states after being slid As shown in FIG. 4 and FIG. 5, the portable wireless information terminal apparatus of this embodiment is related to a portable telephone. A terminal main body unit 1 of the portable wireless information terminal apparatus is divided into an upper casing 1a and a lower casing 1b. These upper casing 1a and lower casing 1b are turnably (in a state that they can be opened and closed) connected to each other by a hinge 2.

The upper casing 1a h as a receiver unit 3. The lower casing 1b has a display unit 4, an operational section 5 and a transmitter unit 6. The receiver unit 3 is provided on a substantial center at an upper portion of a surface Sa on which the upper casing 1a is opened and exposed. The lower casing 1b has a lower casing main body unit 11b and a movable body 12b. The movable body 12b is constructed so as to be slid into the lower casing main body unit 11b when the lower casing 1b is opened through the hinge 2 (refer to FIG. 5).

The movable body 12b constitutes a part of a surface Sb on which the lower casing 1b is opened and exposed. The display unit 4 and the operational section 5 are provided on the exposed surface Sb of the movable body 12b. The transmitter unit 6 is fixed on the left side at the lower potion of the exposed surface Sb of the lower casing main body unit 11b in a condition that the lower casing 1b is opened.

As shown in FIG. 5, a rail unit 7 extending in a longitudinal direction is formed on an inner surface of a side wall in the longitudinal direction of the lower casing main body unit 11b. The movable body 12b is slidably engaged with the rail unit 7 of the lower casing main body unit 11b. The movable body 12b is slid along (downward) the longitudinal direction of the lower casing main body unit 11b, in a state that it can be advanced and retreated.

Accordingly, the movable body 12b having the display unit 4 and the operational section 5 can be pulled out up to any position. Moreover, the operational section 5 can be operated while viewing the information within the terminal unit displayed on the display unit 4 even during calling.

Furthermore, as shown in FIG. 5, the movable body 12b and the lower casing main body unit 11b are signal-connected to each other through an infrared ray by an infrared ray emitting section 9 and an infrared ray receiving section 10. After the display unit 4 is viewed by a user, the infrared ray emitting section 9 outputs a data signal inputted by the operational section 5 as an optical signal. This infrared ray emitting section 9 is provided on the left side of the outer surface of the side wall (the upper side of FIG. 5) in the lateral direction of the movable body 12b. The infrared ray receiving section 10 is provided on the left side of the inner surface of the side wall (the upper side of FIG. 5) in the lateral direction of the lower casing main body unit 11b.

The infrared ray emitting section 9 and the infrared ray receiving section 10 are disposed so as to be opposite to each other on the straight line along the longitudinal direction of the lower casing 1b. The infrared ray emitting section 9 emits a light toward the infrared ray receiving section 10. A straight light communication path is generated between the infrared ray emitting section 9 and the infrared ray receiving section 10. In this case, even if the movable body 12b is slid into the longitudinal direction of the lower casing 1b with respect to the lower casing main body unit 11b, since the sliding direction thereof is identical to the light emitting direction of the infrared ray emitting section 9 (the light receiving direction of the infrared ray receiving section 10), the straightness of the light communication path is never damaged.

Figure 6:
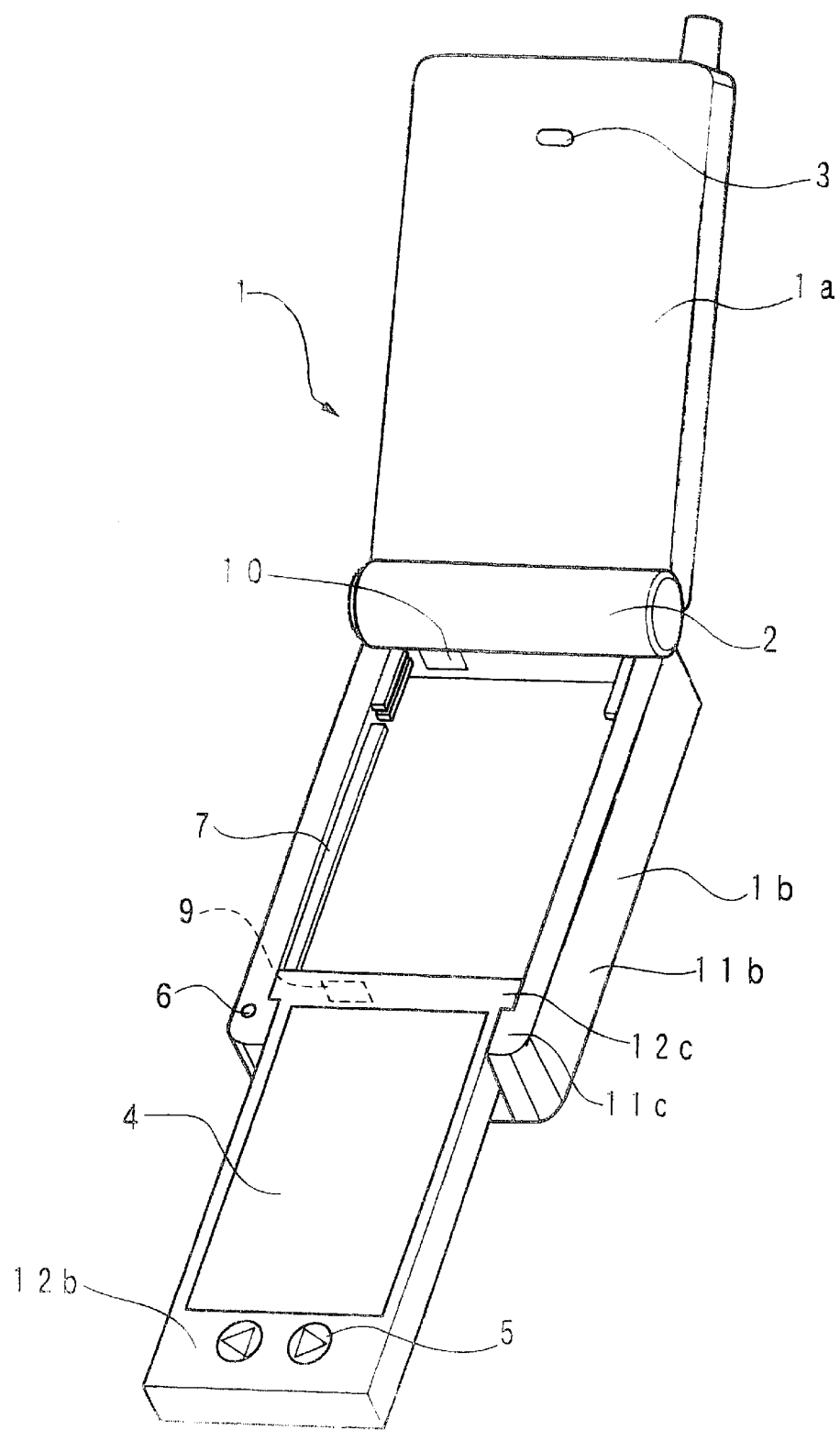
FIG. 6 is a perspective view showing a variation of the first embodiment of the portable wireless information terminal apparatus of the present invention, and shows the states of the display and the operational section after being slid.

Moreover, a structure shown in FIG. 6 may be employed in order to improve the directivity of the infrared ray in the infrared ray communication. That is, when the movable body 12b is pulled out from the lower casing main body unit 11b, it may be considered that the movable body 12b is tilted because of the lack of support force, since the engagement of the movable body 12b with the majority of the rail 7 of the lower casing main body unit 11b is disengaged. As shown in FIG. 6, in order to make the support force stronger when the movable body 12b is pulled out, curved engagements 12c, 11c are formed at the movable body 12b and the lower casing main body unit 11b, respectively. The mutual engagement between these engagements 12c and 11c does not cause the movable body 12b to be tilted when it is pulled out. Thus, the light emitted by the infrared ray emitting section 9 straight reaches the infrared ray receiving section 10. Hence, the engagements 12c, 11c function as a light line axis variation suppressing means.

As mentioned above, since the display unit 4 and the operational section 5 are signal-connected to the side of the terminal apparatus (the side of the lower casing main body unit 11b) through the infrared ray, it is not necessary that they are connected by using the wiring connection such as a wire, a cable and the like. Therefore, the movable body 12b can be constructed so as to be freely slid.

As mentioned above, according to the portable wireless information terminal apparatus of this embodiment, the sliding operation of the display unit 4 and the operational section 5 into the lower casing main body unit 11b enables the information screen-displayed on the display unit 4 to be viewed while holding the lower casing main body unit 11b and making a call, and also enables the operation of the operational section 5 while making a call and viewing the display unit 4.

Since the operational section 5 is constructed so as to be slid and moved from the lower casing main body unit 11b, the user can operate the operational section 5 in a condition that a distance between the receiver unit 3 provided on the upper casing 1a or the transmitter unit 6 provided on the lower casing main body unit 11b and the ear or the mouth is kept. This results in an effect that the operability of the operational section 5 itself can be improved.

Incidentally, the sliding direction of the movable body 12b may be not only in upper and lower directions (direction along the longitudinal direction ) with respect to the front of the portable wireless information terminal apparatus such as this embodiment, but also in left and right directions (direction along the lateral direction). In this case, a constitution is desirable that enables the sliding operation in not only either the left or right direction but also in both the left and right directions. Accordingly, for example, when the user holds the lower casing main body unit 11b with his left hand, the movable body 12b can be slid into the right in FIG. 5. Thus, the display unit 4 and the operational section 5 are not concealed by the face of the user. (At this time, if the movable body 12b is slid into the left, the movable body 12b is turned to the jaw of the face of the user). From the similar reason, on the contrary, when the user holds the lower casing main body unit 11b with his right hand, the movable body 12b can be slid into the left in FIG. 5.

The movement of the movable body 12b into the lower casing main body unit 11b is not limited to the sliding mechanism of using the rail. For example, the movable body 12b may be tiltably supported at a point with respect to the lower casing main body unit 11b so that the tilting route of the movable body 12b may be circle.

In this embodiment, the movable body 12b on which the display unit 4 and the operational section 5 are provided is formed by a sheet of flat plate (rigid body). Instead of it, for example, an angle of a portion of the display unit 4 of the movable body 12b may be constructed so as to be adjustable (inversely and/or rotatably) after the movable body 12b is pulled out from the lower casing main body unit 11b. Accordingly, the angle of the display unit 4 can be adjusted such that the user easily views it, and further the visibility of the display unit 4 can be improved.

The operational section 5 is not always provided on the same material (the movable body 12b and the like) as the display unit 4. For example, when a number of buttons of the operational section 5 is especially small, the operational section 5 may be provided on the position where the finger of the hand with which the lower casing main body unit 11b is held is naturally placed (the outer surface on the side wall in the longitudinal direction and the like).

In this embodiment, the terminal main body unit 1 is foldably constituted by the upper casing 1a and the lower casing 1b. Thus, when the terminal apparatus is not used, the upper casing 1a is folded (closed) and functions as a cover to thereby provide an effect of protecting the display unit 4.

When the upper casing 1a is closed, a slide stopper, which prevents the movable body 12b from being slid, may be provided on the upper casing 1a. If the terminal main body unit 1 is not used, the movable body 12b may be erroneously slid into the lower casing main body unit 11b. However, this slide stopper protects the damage of the display unit 4 and the error operation of the operational section 5.

Figure 7:
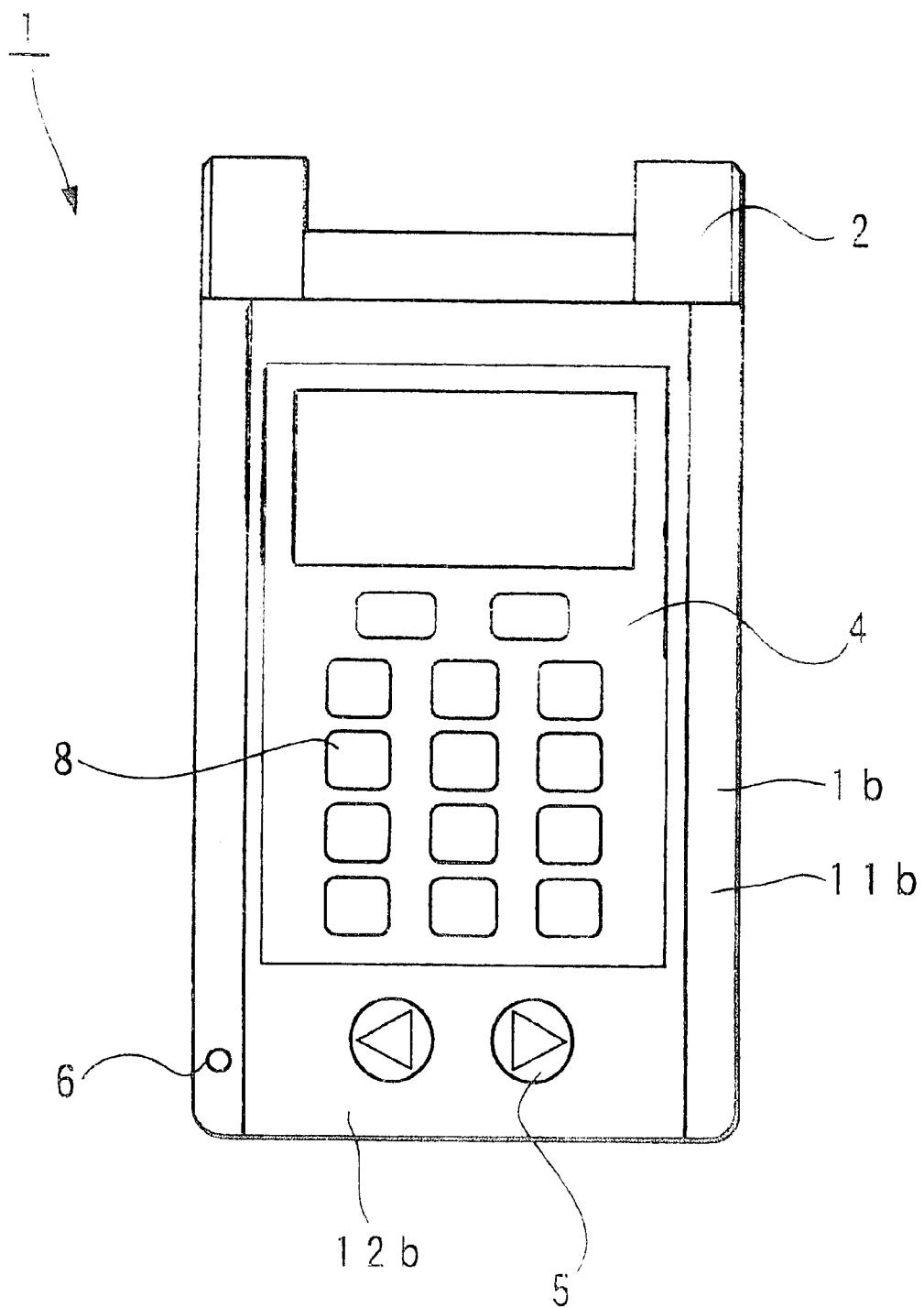
FIG. 7 is a front view showing a variation of the first embodiment of the portable wireless information terminal apparatus of the present invention, and shows the states of the display and the operational section before being slid.

FIG. 7 is a front view showing a variation of this embodiment, and shows the state before the movable body 12b is slid. Incidentally, the side of the upper casing 1a is omitted in FIG. 7. As shown in FIG. 7, the display unit 4 in this variation is constituted as a touch panel and provided with a key operation section 8 in which a key input is possible. In this case, this display unit 4 can have a configuration in which a pen input is possible. Then, in that case, it can be used for a memo and the like during calling.

[Second Embodiment]

Next, a second embodiment of the portable wireless information terminal apparatus of the present invention is explained with reference to FIG. 8.

Figure 8:
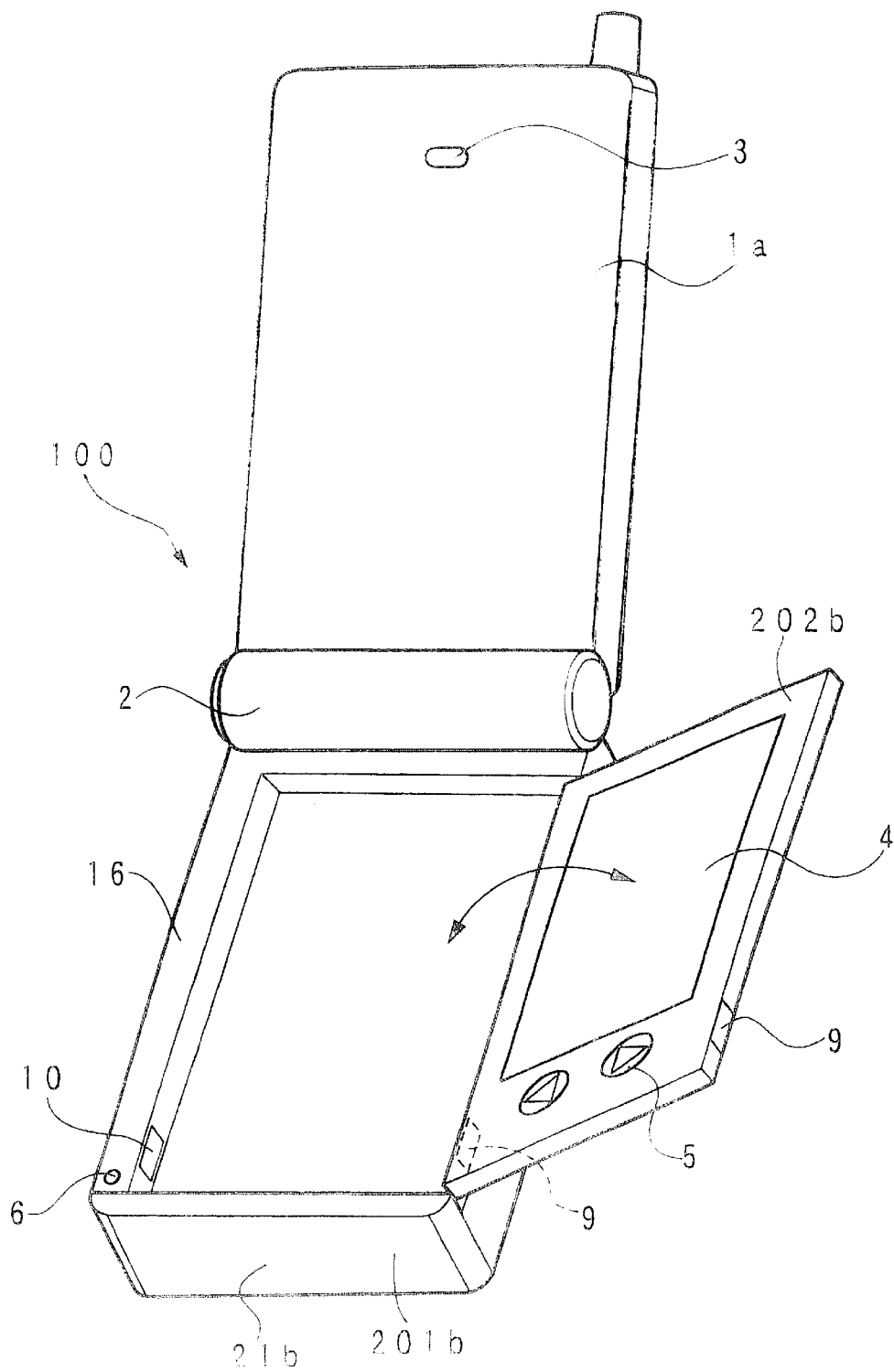
FIG. 8 is a perspective view in an open state showing a second embodiment of the portable wireless information terminal apparatus of the present invention.

FIG. 8 is a perspective view in an open state showing the second embodiment.

As shown in FIG. 8, the terminal main body unit 100 of this embodiment is provided with: a lower casing main body unit 201b and a movable body 202b, as a lower casing 21b instead of the lower casing 1b of the first embodiment. A display unit 4 and an operational section 5 are provided on the movable body 202b. In this embodiment, the movable body 202b is rotatably disposed, through a hinge (not shown) disposed at an upper portion of a right side in a longitudinal direction of the lower casing main body unit 201b, with the longitudinal direction as a rotational axis direction (refer to arrows of FIG. 8).

When the movable body 202b is in a closed state (refer to the left arrow of FIG. 8), it is accommodated in the lower casing main body unit 201b. At this time, the display unit 4 and the operational section 5 are opposite to the inner surface of the lower casing main body unit 201b, and they are not exposed outside. When the display unit 4 and the operational section 5 are in the open state (refer to the right arrow of FIG. 8), they are disposed such that they are exposed and face on the front side of the terminal main body unit 100. At this time, the movable body 202b is located at the position at which it projects to the right on extension of a line in a lateral direction of the terminal main body unit 100, as shown in FIG. 8. Accordingly, especially, when holding the lower casing main body unit 201b with his left hand, the display unit 4 and the operational section 5 face on a front side in a visual direction of the user to be easy to use.

When the movable body 202b is tilted through the hinge (not shown), the angle of the front of the movable body 202b (the mount surface of the display unit 4 and the operational section 5) is kept at any angle at which the user easily views the display unit 4 and the operational section 5. In this case, the angle of the movable body 202b may be kept by the sliding friction of the hinge (not shown), or may be kept by contacting the movable body 202b with a stopper (not shown) to thereby stop.

The movable body 202b and the lower casing main body unit 201b are signal-connected to each other through the infrared ray, by the infrared ray emitting section 9 and the infrared ray receiving section 10, similarly to the case of the first embodiment.

Accordingly, since the display unit 4 and the operational section 5 are opened through the hinge, the operational section 5 can be operated while viewing information within the terminal unit displayed on the display unit 4 even during calling.

In this embodiment, as the open direction of the movable body 202b (the display unit 4 and the operational section 5), the hinge is disposed along the side in the longitudinal direction of the lower casing main body unit 201b, and then it is tilted with the side in the longitudinal direction as the tilting axis so that the movable body 202b is opened laterally. However, the open direction of the movable body 202b is not limited thereto, in the present invention. Then, the hinge may be disposed along a lower side wall in a lateral direction of the lower casing main body unit 201b so that the movable body 202b is opened longitudinally with the lower side wall in the lateral direction as the tilting axis.

In both the first embodiment and this embodiment, the moving directions of the movable bodies 12b, 202b are the directions in which the movable bodies 12b, 202b are easily viewed, when the user holds the lower casing main body units 11b, 201b and makes a call. It is detailed below. The transmitter unit 6 is located on the left side in the terminal main body units 1, 100 shown in FIGS. 5 to 8. Thus, in order to hold the terminal main body units 1, 100 at the position at which the distance from the mouth of the user is short, it is convenient to hold with his left hand. Hence, when the terminal main body units 1, 100 are used, the face of the user is located on the left side of the terminal main body units 1, 100 in the drawings, in many cases. Accordingly, if the moving directions of the movable bodies 12b, 202b are left in the drawings with respect to the lower casing main body units 11b, 201b, the movable bodies 12b, 202b are closer to the face of the user. This results in the poor visibility. Therefore, in the first and second embodiments, the moving directions of the movable bodies 12b, 202b avoid the left side from the transmitter unit 6 in the drawings.

The directions when moving the movable bodies 12b, 202b are determined as described below, from the above descriptions. Tn the first and second embodiments, each of the terminal main body units 1, 100 has two long sides 15, 16 which face on the front surface (in FIG. 4 to FIG. 8) and are opposite to each other. The transmitter unit 6 is disposed closer to the long side 16 than the first long side 15 among the two long sides 15, 16, in each of the terminal main body units 1, 100. The second long side 16 and the extension line of the second long side 16 are assumed to be a space generation start end, and a space spreading from the space generation start end toward the first long side 15 is assumed to be a space to move each of the movable bodies 12*b*, 202*b*. In this case, it is natural that the space includes the right side in the drawings rather than the first long side 15.

As mentioned above, according to the portable wireless information terminal apparatus of this embodiment, it is possible to rotate (tilt) the display unit 4 and the operational section 5 to thereby view the information displayed on the display unit 4 while calling. Hence, this embodiment has the effect of operating the operational section 5 while calling, similarly to the case of the first embodiment.

Since the operational section 5 is constructed so as to be rotatable, the operational section 5 can be operated while maintaining the distance from the ear and the mouth. Hence, this embodiment has the effect of improving the operability of the operational section 5 itself, similarly to the case of the first embodiment.

The movable body 12*b* is slid in the first embodiment, and the movable body 202*b* is tilted in the second embodiment. However, the means for moving the movable body into the lower casing main body unit is not limited to them. That is, it is natural that the combination of both the sliding mechanism and the tilting mechanism makes the moving direction and the moving range of the movable body wider to thereby make the visibility of the display unit and the operability of the operational section much easier.

In the first and second embodiments, the terminal main body unit 1 is the portable wireless information terminal apparatus in which the upper casing 1*a* and the lower casing 1*b* are foldably constructed through the hinge 2. However, one piece type may be constructed in which the hinge 2 is removed and the upper casing 1*a* and the lower casing 1*b* are coupled to each other.

Moreover, another display unit other than the display unit 4 may be provided on the rear surface of the upper casing 1*a* and the lower casing main body units 12*b*, 201*b* and the like.

In the first and second embodiments, the operational section 5 is disposed on the movable bodies 12*b*, 202*b* on which the display unit 4 is provided, and is constructed so as to be moved (slid and tilted) together with the display unit 4. However, the present invention is not limited thereto. For example, the operational section 5 may not be disposed on the movable bodies 12*b*, 202*b* and then only the operational section 5 may be disposed separately from the lower casing main body units 11*b*, 201*b* and the movable bodies 12*b*, 202*b*. Then, the separated operational section 5 can be communicated with the lower casing main body units 11*b*, 201*b* wirelessly or through a wiring code to further improve the operability of the operational section 5. Namely, the separated configuration cancels the restriction in the positional relation with the terminal main body unit 1. Therefore, for example, while the user holds the terminal main body unit 1 near his face with his left hand, he can operate the operational section 5 near his waist away from his face with his right hand.

As explained above, according to the portable wireless information terminal apparatus of the present invention, it is possible to freely move the display unit from the terminal main body unit to easily view the information displayed on the display unit while calling. Moreover, when not in use, the display unit is moved up to the position at which the display unit does not project largely from the terminal main body unit, and then the display unit is accommodated in the terminal main body unit. Hence, this results in an effect of an excellent portability.

Especially, since the display unit is slid along the terminal main body unit, the display unit can be moved to any position at which the display unit is easily viewed even during calling.

The display unit is rotated with the hinge with respect to the terminal main body unit so as to be opened and closed. Therefore, it is possible to easily open the display unit even during calling and also possible to view the information displayed on the display unit.

The display unit is provided with the operational section for operating the terminal apparatus. Therefore when the display unit is slid or rotated, the operational section can be operated simultaneously. Also the various operations of the operational section can be performed simultaneously while the user views the display unit even during calling.

The display unit and the operational section are optically connected to the terminal apparatus by an infrared ray emitting section and an infrared ray receiving section for infrared ray signal transmission. Therefore the wiring connection, such as the wire, the cable and the like, is not required. This results in the configuration that the display unit and the like can be freely slid or rotated.

Moreover, the present invention applies to the portable wireless information terminal apparatus such as the foldable type telephone and the like. Threrfore the utilization of the apparatus using the present invention can be improved without losting the portability of the foldable type portable telephone and the like.

What is claimed is:

1. A portable wireless information terminal apparatus comprising a main body unit having a first and a second casing rotatably coupled together, the first casing having a transmitter unit, and the second casing having a receiver unit and a data display unit which is movably provided on one of the first and second casings of the main body unit such that the data display unit may be caused to project beyond the main body unit and be seen by a user when the receiver unit and the transmitter unit are being used, wherein a wireless communication path is provided between the main body unit of the terminal and the data display unit and wherein the main body unit is a terminal unit which has at least two sides substantially opposite to one another, in which the transmitter unit is closer to a first side than a second side of the two sides of the main body unit of the terminal, and in which the data display unit is tiltable with respect to the main body unit in such a direction that the data display unit is spaced from the first side, with respect to an axial line along the second side, and disposed near to the second side.

2. A portable wireless information terminal apparatus comprising a main body unit having a receiver unit and a transmitter unit, the receiver unit and the transmitter unit being in respective casings which are rotatably coupled together, and a movable body which is movably provided on one of the casings of the main body unit of the terminal, in which the movable body includes an operational section for operating the main body unit of the terminal, and a data display unit, wherein the data display unit is able to project beyond the main body unit and be seen by a user of the receiver unit and the transmitter unit when they are being used and wherein an infrared ray communication path is provided between the main body unit of the terminal and the movable body wherein an infrared ray communication is carried out between the terminal main body unit and the movable body, and the movable body is moved along a communication path of the infrared ray communication, when being moved into the terminal main body unit and wherein the main body unit of the terminal has at least two sides provided substantially opposite to one another, in which the transmitter unit is arranged closer to a first side than to a second side of the two sides in the main body unit of the terminal, and in which the movable body is tiltable in a direction spaced from the first side, with respect to an axial line along the second side disposed near to the second side.

* * * * *